W. E. MARQUART.
COLLAPSIBLE RIM.
APPLICATION FILED DEC. 27, 1919.
1,393,302. Patented Oct. 11, 1921.
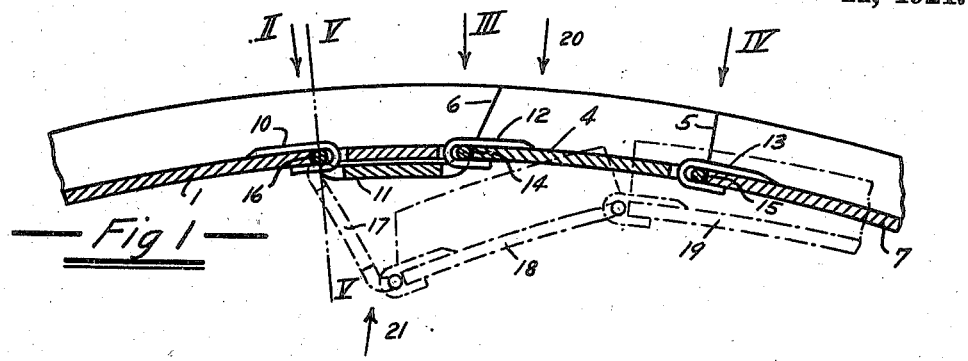
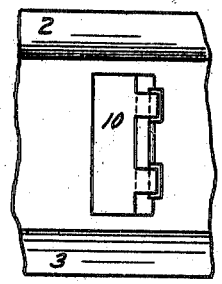 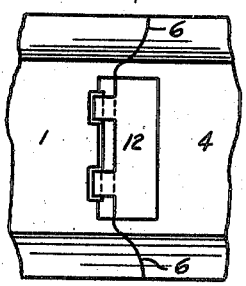 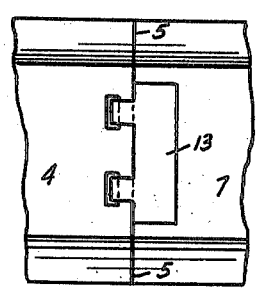 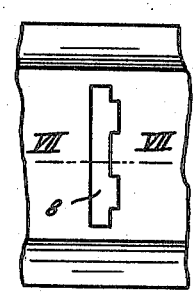
Fig 2 — Fig 3 — Fig 4 — Fig 6
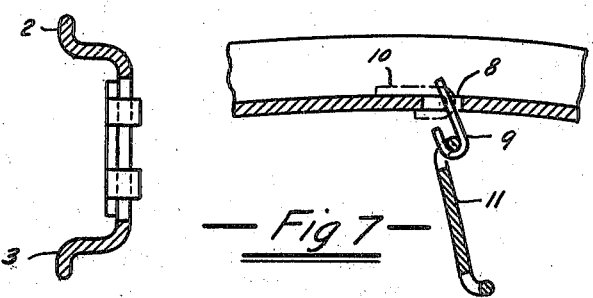 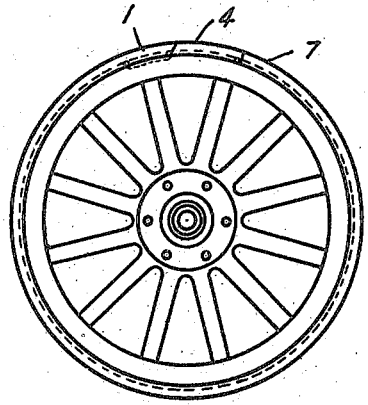
Fig 5 — Fig 7 — Fig 8
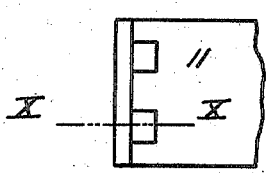 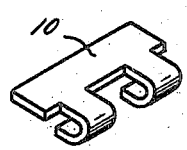
Fig 9 — Fig 11
Fig 10
INVENTOR.
Walter E. Marquart.
BY
Miller & Henry
ATTORNEYS

UNITED STATES PATENT OFFICE.

WALTER E. MARQUART, OF SAN FRANCISCO, CALIFORNIA.

COLLAPSIBLE RIM.

1,393,302. Specification of Letters Patent. Patented Oct. 11, 1921.

Application filed December 27, 1919. Serial No. 347,728.

*To all whom it may concern:*

Be it known that I, WALTER E. MARQUART, a citizen of the United States, and a resident of the city and county of San Francisco, State of California, have invented new and useful Improvements in Collapsible Rims, of which the following is a specification.

My invention has for its object the forming and construction of a vehicle rim such that it may be collapsed into a smaller form for the purpose of disconnecting it from a rubber tire or the like, as for the purpose of readily changing tires. In my rim when assembled with the well known form of tire the line of compression lies within the line of the rim no component or angular strains being present to distort the parts as in rims heretofore.

By referring to the accompanying drawings my invention will be made clear.

Figure 1 is a sectional view through a portion of the rim showing the collapsible parts in their assembled position, and with the same parts in their collapsed position by dotted line, in a plane at right angles to the wheel axle.

Fig. 2 is a plan view of the thrust joint in the direction of the arrow II of Fig. 1.

Fig. 3 is a plan view of the thrust joint in the direction of the arrow III of Fig. 1.

Fig. 4 is a plan view of the thrust joint in the direction of the arrow IV of Fig. 1.

Fig. 5 is a cross section on the line V—V of Fig. 1.

Fig. 6 is a plan view of the slot in the rim body before the assembly of the parts and in the direction of the arrow II of Fig. 1.

Fig. 7 is a cross section of Fig. 6 on the line VII—VII, to show the manner of assembling.

Fig. 8 shows the rim assembled on the vehicle wheel.

Fig. 9 is a plan view of the end of the link member 11 in the directon of the arrow II of Fig. 1.

Fig. 10 is a cross section on the line X—X of Fig. 9.

Fig. 11 is a perspective view of one of the retaining members as 10.

Throughout the figures similar numerals refer to identical parts.

It is understood that my rim is to be used in connection with the well known form of wheel, as for example—that of the automobile, whereby the rim is adequately supported for use on said wheel when assembled, and in the figures illustrating my invention, and the description which follows, I have shown the invention as applied to a well known form of automobile wheel rim adapted to carry a tire, which tire is supported against distortion by the assembled side flanges 2 and 3 of the rim 1.

The circular rim is made up of the main body portion having ends 1 and 7 and a segment 4, which may advantageously be cut from a complete circular rim on the lines as 5, 6, and when removed permits the rim body ends 1, 7 to approach each other and therefore the rim to collapse into a smaller circle and be readily removed from the tire.

The end of the body section 1 is perforated with an opening substantially as indicated at 8, Fig. 6, and a retaining piece 9, herein shown as comprising a flat body portion and reversely bent tongues, is passed preferably from the under side through the said slot 8, and into the position 10 and there welded (see Fig. 7) or otherwise secured, thus effectually covering the said slot on the tire side.

It is to be understood that a transverse pintle portion at one end of the link member 11 is to be engaged by the hinging portions of the retaining member 10 in the position shown in Fig. 1 when the retaining piece 10 is assembled and welded on the rim at 10. The rim end 1 is also to be cut away on the lines 6, 6 (see Figs. 1 and 3), and a suitable slot cut therein for a similar retaining member 12, and which is adapted to hingedly engage the opposite end of the link 11 in the same manner as at the joint V—V. The other end 7 of the rim is to be provided with a similar retaining piece 13 adapted to assemble with the rim section 4 in the same manner and retain the alinement of its end with the end 7 of the rim during periods of collapse.

Referring specifically to Fig. 1, which shows the rim in its complete assembled position, it is to be noted that the link 11 and the ring segment 4 have their ends abutting at 14 and that a similar abutment against the end 7 at 15 and against the part 1 at 16, brings the rim ends 1 and 7 into a line of compression with no other elements involved than link 11 and segment 4. That is, a true line of compression exists between 1, 11, 4 and 7 and through the abutting ends at 16, 14, 15 and that for the purposes of collapse retaining members 10, 12 and 13 are constructed and adapted to prevent the displacement or loss of parts.

The position of collapse of the link 11 is shown in the dotted position 17 and that of the segment 4 in the position 18, the rim end 7 being then displaced with respect to the rim end 1 into the position 19.

I prefer to form the retainers as indicated in Fig. 11 and to assemble these as with the link 11, as shown in Fig. 7, and it will be seen that the entire end, and each end of link 11, and the entire end and each end of segment 4, form compression abutments entirely without any parts being in sheer.

The operation is as follows:

In order to collapse the rim as for removing the tire, a blow against the rim or the tire in the direction of the arrow 20 of Fig. 1 will cause the parts 11 and 4 to spring into the positions 17 and 18, when the tire may be readily removed. It may then be reassembled by pressure as with the foot in the direction of the arrow 21 when the parts 11, 4 will spring back into their original positions.

The form of the retaining members 10, 12 and 13 are preferably all as indicated in Fig. 11, and the coöperating ends 1 and 7 of the link 11 and the segment 4 formed as above described retain alinement of the parts, and insure their doweling together in combination with the retaining plates and coöperating ends, thus effectually securing alinement at all times.

Claims:

1. A vehicle wheel rim having a segment cut therefrom, one end of said segment pierced with a hole and one boundary of said hole formed as an abutment, the opposite end of said segment formed to engage a substantially similar abutment formed in a coöperating link, a coöperating link having an abutment formed on each end, and adapted to coöperate with the segment and with the rim, the ends of the link fitting within a recess formed in the body of the rim and the body of the segment, and retaining means comprising hinge members having portions to engage the link ends and segment and formed to lie flat upon the rim, said means securing the alinement of the abutments.

2. A collapsible tire rim for vehicles consisting of an annular rim having a removable segment, a link formed with ends which respectively abut the rim and one end of said segment, the link and one end of the rim, the link and the segment and the segment and the other end of the rim formed to assemble in a line of compression, and retaining means for the abutting ends comprising hinge plates secured upon the inner face of the rim and segment and having reversely bent portions to pivotally connect the link with the rim and one end of the segment and to connect the other end of the segment with the rim.

3. A collapsible tire rim for vehicles consisting of an annular rim including a segment, a link formed with ends which respectively abut the rim and one end of said segment, the link and one end of the rim, the link and the segment and the segment and the other end of the rim formed to assemble in a line of compression, and retaining means for the abutting ends including plates rigidly secured to one and pivotally secured to the other abutting end, said plates formed to lie flat within the rim, and the segment and the link adapted to swing out of said line of compression to collapse the rim and into the line of compression to restore the rim form.

WALTER E. MARQUART.